United States Patent [19]
Setiabudi

[11] Patent Number: 6,001,909
[45] Date of Patent: Dec. 14, 1999

[54] CURABLE COMPOSITIONS CONTAINING CYCLOOLEFIN AND FILLER

[75] Inventor: Frans Setiabudi, Eschbach, Germany

[73] Assignee: Ciba Specialty Chemicals Corp., Tarrytown, N.Y.

[21] Appl. No.: 08/736,703

[22] Filed: Oct. 28, 1996

[30] Foreign Application Priority Data

Nov. 2, 1995 [CH] Switzerland .................. 03108/95

[51] Int. Cl.⁶ ...................................... C08J 5/32
[52] U.S. Cl. ................ 524/265; 524/101; 524/236; 524/366; 526/283
[58] Field of Search ................... 524/265, 101, 524/236, 366; 526/283

[56] References Cited

U.S. PATENT DOCUMENTS

| | | | |
|---|---|---|---|
| 4,923,943 | 5/1990 | Hara et al. | 526/283 |
| 5,354,939 | 10/1994 | Hollstein et al. | 523/206 |
| 5,438,093 | 8/1995 | Stricharczuk et al. | 524/708 |
| 5,463,002 | 10/1995 | Sugawara et al. | 526/161 |

FOREIGN PATENT DOCUMENTS

| | | |
|---|---|---|
| 0348193 | 12/1989 | European Pat. Off. . |
| 0348852 | 1/1990 | European Pat. Off. . |
| 9616100 | 5/1996 | WIPO . |
| 9620235 | 7/1996 | WIPO . |

OTHER PUBLICATIONS

Herbert Terry & Sons Ltd. advertisment, from The Automobile Engineer Magazine, p.32, Nov. 1948.

*Primary Examiner*—Peter D. Mulcahy
*Attorney, Agent, or Firm*—Michele A. Kovaleski; David R. Crichton

[57] ABSTRACT

A composition, comprising
(a) at least one tight cycloolefin,
(b) a catalyst for the ring-opening metathesis polymerisation,
(c) a filler, and
(d) a silane of formula I

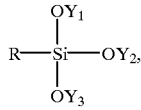

(I)

wherein R is a polyvalent organic group having 2 to 100 carbon atoms, where one or more than one carbon atom can be replaced by O, S, N or Si atoms and $Y_1$, $Y_2$ and $Y_3$ are each independently of one another $C_1$–$C_{20}$alkyl, $C_5$–$C_{20}$aryl, $C_6$–$C_{20}$aralkyl, $C_5$–$C_{12}$cycloalkyl, $C_2$–$C_{20}$-alkoxyalkyl or $C_1$–$C_{20}$acyl, gives cured products having excellent mechanical and electrical properties and which is particularly suitable as encapsulating material for electrical and electronic components.

18 Claims, No Drawings

CURABLE COMPOSITIONS CONTAINING CYCLOOLEFIN AND FILLER

The present invention relates to a composition comprising a tight cycloolefin, a ROMP catalyst, a filler and a silane; to a process for the preparation of a metathesis polymer from this composition as well as to the use of this composition as encapsulating material for electrical or electronic components.

Filled epoxy resin systems are often used as encapsulating materials for the preparation of electrical and electronic components. However, such epoxy resin casting compositions, which are disclosed, inter alia, in EP-A-348 193 or EP-A-540 467, have drawbacks with respect to toughness and heat stability.

Owing to their good mechanical and electrical properties, cycloolefins, which can be polymerised via ring-opening metathesis polymerisation (ROMP), should in principle be suitable for electroapplication. Such systems are disclosed, inter alia, in WO 96/16100, WO 96/20235 or in EP-A-348 852. However, the addition of fillers results in a pronounced impairment of the mechanical and electrical properties of these materials.

It has now been found that the mechanical and electrical properties, in particular the toughness, heat stability and the dielectric loss factor, can be markedly enhanced by the addition of specific silanes to filled cycloolefinic systems.

The invention relates to a composition comprising
(a) at least one tight cycloolefin,
(b) a catalyst for the ring-opening metathesis polymerisation,
(c) a filler, and
(d) a silane of formula I

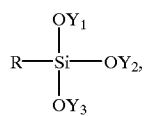

wherein R is a monovalent organic group having 2 to 100 carbon atoms, where one or more than one carbon atom can be replaced by O, S, N or Si atoms and where $Y_1$, $Y_2$ and $Y_3$ are each independently of one another $C_1$–$C_{20}$alkyl, $C_5$–$C_{20}$aryl, $C_6C_{20}$aralkyl, $C_5$–$C_{12}$cycloalkyl, $C_2$–$C_{20}$-alkoxyalkyl or $C_1$–$C_{20}$acyl.

Within the scope of this invention, tight cycloolefins will be understood as meaning all cycloolefins with the exception of cyclohexene and its derivatives, which cannot be polymerised via the ring-opening metathesis.

The tight cycloolefins can be monocyclic or polycyclic condensated or bridged ring systems, typically those having two to four rings, which are unsubstituted or substituted and which can contain hetero atoms, such as O, S, N or Si, in one or more than one ring and/or condensated aromatic or heteroaromatic rings, such as o-phenylene, o-naphthylene, o-pyridinylene or o-pyrimidinylene. The individual cyclic rings can contain 3 to 16, preferably 3 to 12 and, particularly preferably, 3 to 8, ring members. The tight cycloolefins can contain further non-aromatic double bond, preferably 2 to 4 such additional double bonds, depending on the size of the ring. The ring substituents are inert, i.e. these substituents do not impair the chemical stability and the thermostability of the ROMP catalysts.

If the tight cycloolefins contain more than one double bond, for example 2 to 4 double bonds, then it is possible that crosslinked polymers form, depending on the reaction conditions, the selected monomer and the amount of catalyst.

Component (A) in the composition of this invention is preferably a compound of formula II

wherein $Q_1$ is a radical containing at least one carbon atom, which forms, together with the —CH=$CQ_2$ group, an alicyclic ring having at least 3 rings, which can contain one or more than one hetero atom selected from the group consisting of silicium, phosphorus, oxygen, nitrogen or sulfur and which is unsubstituted or substituted by halogen, =O, —CN, —$NO_2$, $R_1R_2R_3$Si—(O)$_u$—, —COOM, —$SO_3$M, —$PO_3$M, —COO($M_1$)$_{1/2}$, —$SO_3(M_1)_{1/2}$, —$PO_3(M_1)_{1/2}$, $C_1$–$C_{20}$alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$—X—; or wherein two adjacent carbon atoms are linked via —CO—O—CO— or —CO—$NR_5$—CO—; or wherein an alicyclic, aromatic or heteroaromatic ring is fused to adjacent carbon atoms of the alicyclic ring, which alicyclic, aromatic or heteroaromatic ring is unsubstituted or substituted by halogen, —CN, —$NO_2$, $R_6R_7R_8$Si—(O)$_u$—, —COOM, —$SO_3$M, —$PO_3$M, —COO($M_1$)$_{1/2}$, —$SO_3(M_1)_{1/2}$, —$PO_3(M_1)_{1/2}$, $C_1$–$C_2$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$—; X and $X_1$ are each independently of the other —O—, —S—, —CO—, —SO—, —$SO_2$—, —O—CO—, —COO—, —CO—$NR_5$—, —$NR_{10}$—CO—, —$SO_2$—O— or —O—$SO_2$—; $R_1$, $R_2$ and $R_3$ are each independently of one another $C_1$–$C_{12}$alkyl, $C_1$–$C_{12}$perfluoroalkyl, phenyl or benzyl; $R_4$ and $R_{13}$ are each independently of the other $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl, $C_7$–$C_{16}$aralkyl; $R_5$ and $R_{10}$ are each independently of the other hydrogen, $C_1$–$C_{12}$alkyl, phenyl or benzyl, the alkyl groups in turn being unsubstituted or substituted by $C_1$–$C_{12}$alkoxy or $C_3$–$C_8$cycloalkyl; $R_6$, $R_7$ and $R_8$ are each independently of one another $C_1$–$C_{12}$alkyl, $C_1$–$C_{12}$perfluoroalkyl, phenyl or benzyl; M is an alkali metal, and $M_1$ is an alkaline earth metal; and u is 0 or 1; and where the alicyclic ring formed with $Q_1$ can contain other non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN, $R_{11}$—$X_2$—; $R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl; $X_2$ is —COO— or —CO—$NR_{12}$—; $R_{12}$ is hydrogen, $C_1$–$C_{12}$alkyl, phenyl or benzyl; the abovementioned cycloalkyl, heterocycloalkyl, aryl, heteroaryl, aralkyl and heteroaralkyl groups being unsubstituted or substituted by $C_1$–$C_{12}$alkyl, $C_1$–$C_{12}$alkoxy, —$NO_2$, —CN or halogen, and the hetero atoms of the above-mentioned heterocycloalkyl, heteroaryl and heteroaralkyl groups being selected from the group consisting of —O—, —S—, —$NR_9$— and —N=; and $R_9$ is hydrogen, $C_1$–$C_{12}$alkyl, phenyl or benzyl.

Fused alicyclic rings preferably contain 3 to 8, more preferably 4 to 7 and, most preferably, 5 or 6 ring carbon atoms.

For crosslinking or for regulating the molecular weight, the composition of this invention can contain further olefins capable of metathesis, conveniently in amounts of up to 40 mol %, preferably of 0.01 to 30 mol % and, particularly preferably, of 0.1 to 20 mol %, based on the total amount of the cycloolefins and olefins present.

Suitable olefins capable of metathesis are, for example, cyclooctadiene, cyclooctatrien, norbonadiene or acetylnorbornene. Also suitable are compounds such as 2-butene-1, 4-diol, described in Feast, W. J., Harrison, B, J. Mol. Catal. 65, 63 (1991), or 1-hexene (rearrangements).

As a consequence of the presence of an asymmetric centre in the compounds of formula II, the compounds can occur in optical isomeric forms. Some compounds of formula II can occur in tautomeric forms (e.g. keto-enol tautomerism). In the case of an aliphatic C=C double bond, geometrical isomerism (E-form or Z-form) can also occur. Exo-endo configurations are also possible. Accordingly, formula II embraces all possible stereoisomers which are obtained in the form of enantiomers, tautomers, diastereomers, E/Z isomers or mixtures thereof.

In the definitions of the substituents, the alkyl, alkenyl and alkynyl groups can be straight-chain or branched. This also applies to the, or any, alkyl moiety of groups containing alkoxy, alkylthio, alkoxycarbonyl, and to other groups containing alkyl. These alkyl groups preferably contain 1 to 12, more preferably 1 to 8 and, most preferably, 1 to 4, carbon atoms. These alkenyl and alkynyl groups preferably contain 2 to 12, more preferably 2 to 8, and, most preferably, 2 to 4 carbon atoms.

Alkyl typically includes methyl, ethyl, isopropyl, n-propyl, n-butyl, isobutyl, sec-butyl, tert-butyl as well as the different isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Hydroxyalkyl typically includes hydroxymethyl, hydroxyethyl, 1-hydroxyisopropyl, 1-hydroxy-n-propyl, 2-hydroxy-n-butyl, 1-hydroxyisobutyl, 1-hydroxy-sec-butyl, 1-hydroxy-tert-butyl as well as the different hydroxyl-substituted isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Haloalkyl typically includes fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl as well as halogenated, preferably fluorinated or chlorinated, isopropyl, n-propyl, n-butyl, isobutyl, sec-butyl and tert-butyl groups and also the different isomeric halogenated pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Alkenyl typically includes propenyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-octadec-2-enyl and n-octadec-4-enyl.

Cycloalkyl is preferably $C_5$–$C_8$cycloalkyl, in particular $C_5$cycloalkyl or $C_6$cycloalkyl. Some examples are cyclopropyl, dimethylcyclopropyl, cyclobutyl, cyclopentyl, methylcyclopentyl, cyclohexyl, cycloheptyl and cyclooctyl.

Cyanoalkyl typically includes cyanomethyl (methylnitrile), cyanoethyl (ethylnitrile), 1-cyanoisopropyl, 1-cyano-n-propyl, 2-cyano-n-butyl, 1-cyanoisobutyl, 1-cyano-sec-butyl, 1-cyano-tert-butyl as well as the different isomeric cyanopentyl and hexyl radicals.

Aralkyl preferably contains 7 to 12 carbon atoms and, particularly preferably, 7 to 10 carbon atoms. Aralkyl can be, for example, benzyl, phenethyl, 3-phenylpropyl, α-methylbenzyl, 4-phenylbutyl and α,α-dimethylbenzyl.

Aryl preferably contains 6 to 10 carbon atoms. Aryl can be, for example, phenyl, pentalinyl, indenyl, naphtyl, azulinyl and anthryl.

Heteroaryl preferably contains 4 or 5 carbons atoms and one or two hetero atoms from the O, S and N group. Heteroaryl can be, for example, pyrrolyl, furanyl, thiophenyl, oxazolyl, thiazolyl, pyridyl, pyrazinyl, pyrimidinyl, pyridazinyl, indolyl, purinyl and quinolyl.

Heterocycloalkyl preferably contains 4 or 5 carbon atoms and one or two hetero atoms from the O, S and N group. Heterocycloalkyl can be, for example, oxiranyl, azirinyl, 1,2-oxathiolanyl, pyrazolinyl, pyrrolidinyl, piperidyl, piperazyl, morpholinyl, tetrahydrofuranyl and tetrahydrothiophenyl.

Alkoxy is typically methoxy, ethoxy, propyloxy, isopropyloxy, n-butyloxy, isobutyloxy, sec-butyloxy and tert-butyloxy.

Within the scope of this invention, alkali metal will be understood to mean lithium, sodium, potassium, rubidium and cesium, preferably lithium, sodium and potassium.

Within the scope of this invention, alkaline earth metal will be understood to mean beryllium, magnesium, calcium, strontium and barium, preferably magnesium and calcium.

In the above definitions, halogen will be understood to mean fluoro, chloro, bromo and iodo, preferably fluoro, chloro and bromo.

Compounds of formula II which are particularly suited for the composition of this invention are those wherein $Q_2$ is hydrogen.

Also preferred are compounds of formula II, wherein $Q_1$ is a radical containing at least one carbon atom which, together with the —CH=$CQ_2$ group, forms an 3- to 10-membered alicyclic ring which may contain a hetero atom selected from the group consisting of silicium, oxygen, nitrogen and sulfur and which is unsubstituted or substituted by halogen, —CN, —$NO_2$, $R_1R_2R_3$Si—, —COOM, —$SO_3$M, —$PO_3$M, —COO$(M_1)_{1/2}$, —$SO_3(M_1)_{1/2}$, —$PO_3(M_1)_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_4$—X—: or to which an aromatic or heteroaromatic or alicyclic ring may be fused at the adjacent carbon atoms, which is unsubstituted or substituted by halogen, —CN, —$NO_2$, $R_6R_7R_8$Si—, —COOM, —$SO_3$M, —$PO_3$M, —COO$(M_1)_{1/2}$, —$SO_3(M_1)_{1/2}$, —$PO_3(M_1)_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_{13}$—$X_1$—; $R_1R_2$ and $R_3$ are each independently of the other $C_1$–$C_4$-alkyl, $C_1$–$C_4$perfluoroalkyl, phenyl or benzyl; M is an alkali metal and $M_1$ is a alkaline earth metal; $R_4$ and $R_{13}$ are each independently of the other $C_1$–$C_6$alkyl, $C_1$–$C_6$haloalkyl, $C_1$–$C_6$-hydroxyalkyl or $C_3$–$C_6$cycloalkyl; X and $X_1$ are each independently of the other —O—, —S—, —CO—, —SO— or —$SO_2$—, and $R_6$, $R_7$ and $R_8$ are each independently for the other $C_1$–$C_4$alkyl, $C_1$–$C_4$-perfluoroalkyl, phenyl or benzyl.

Component (a) is particularly preferably norbornene and norbornene derivatives, in particular dicyclopentadiene and dicyclopentadiene derivatives.

Preferred norbornene derivatives are the compounds of formulae III, IV, V and VI

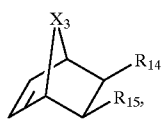
(III)

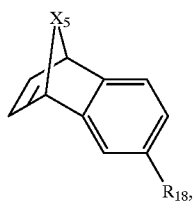
(IV)

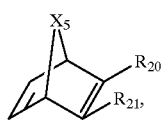
(V)

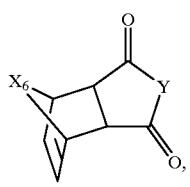
(VI)

wherein $X_3$ is —$CHR_{16}$—, oxygen or sulfur, $R_{14}$ and $R_{15}$ are each independently of the other hydrogen, —CN, trifluoromethyl, $(CH_3)_3SiO$—, $(CH_3)_3Si$— or —$COOR_{17}$, and $R_{16}$ and $R_{17}$ are each independently of the other hydrogen, $C_1$–$C_{12}$alkyl, phenyl or benzyl;

$X_4$ is —$CHR_{19}$—, oxygen or sulfur, $R_{19}$ is hydrogen, $C_1$–$C_{12}$alkyl, phenyl or benzyl, and $R_{18}$ is hydrogen, $C_1$–$C_6$alkyl or halogen;

$X_5$ is $R_{22}$—, oxygen or sulfur, $R_{22}$ is hydrogen, $C_1$–$C_{12}$alkyl, phenyl or benzyl, and $R_{20}$ and $R_{21}$ are each independently of the other hydrogen, CN, trifluoromethyl, $(CH_3)_3SiO$—, $(CH_3)_3Si$— or —$COOR_{23}$, and $R_{23}$ is hydrogen, $C_1$–$C_{12}$alkyl, phenyl or benzyl;

$X_6$ is —$CHR_{24}$—, oxygen or sulfur, $R_{24}$ is hydrogen, $C_1$–$C_{12}$alkyl, phenyl or benzyl, Y is oxygen or

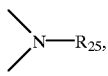

and $R_{25}$ is hydrogen, methyl, ethyl or phenyl.

Illustrative examples of suitable compounds of formula II are the following cycloolefins:

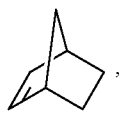
(1)

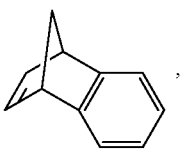
(2)

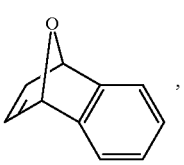
(3)

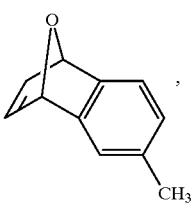
(4)

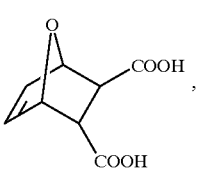
(5)

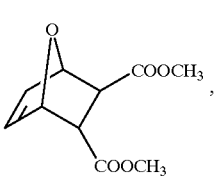
(6)

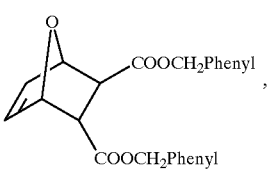
(7)

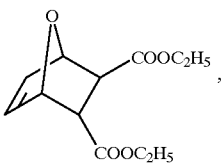
(8)

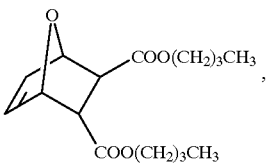
(9)

-continued
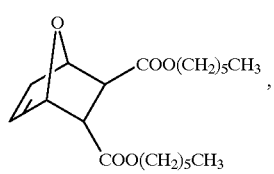 (10)
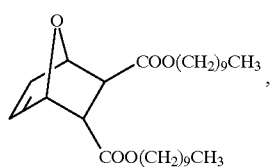 (11)
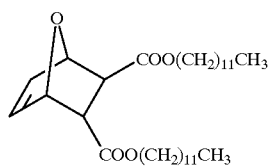 (12)
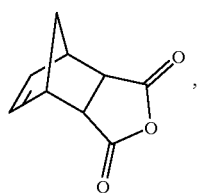 (13)
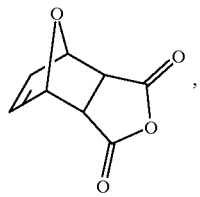 (14)
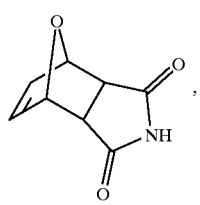 (15)
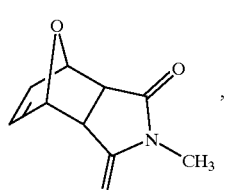 (16)
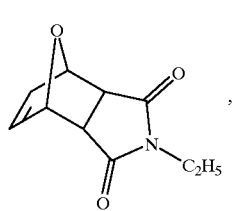 (17)
-continued
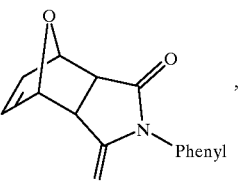 (18)
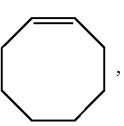 (19)
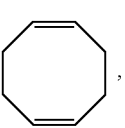 (20)
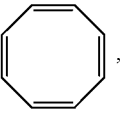 (21)
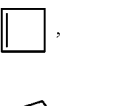 (22)
 (23)
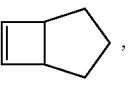 (24)
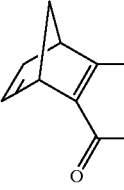 (25)
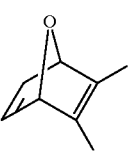 (26)
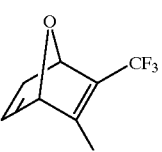 (27)
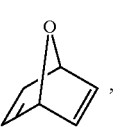 (28)

-continued

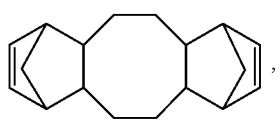
(29)

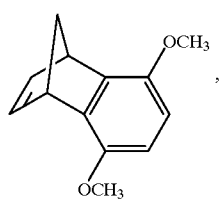
(30)

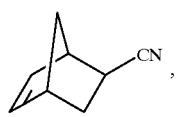
(31)

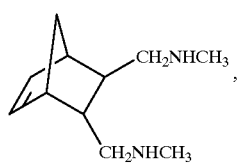
(32)

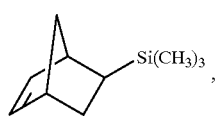
(33)

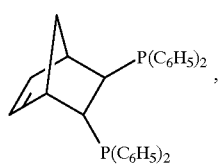
(34)

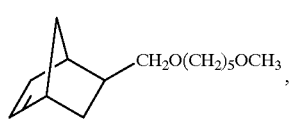
(35)

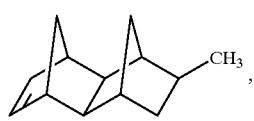
(36)

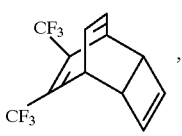
(37)

(38)

-continued

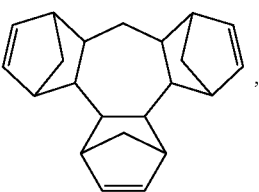
(39)

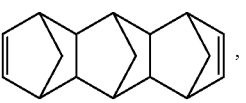
(40)

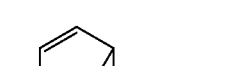
(41)

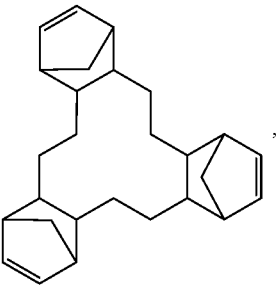
(42)

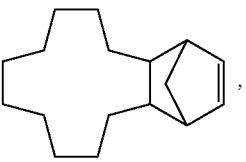
(43)

In a preferred embodiment of this invention, the tight cycloolefins exclusively contain carbon atoms and hydrogen atoms and are preferably 5- or 6-membered rings or ring systems having one to three 5- or 6-membered rings, for example norbornene, alkylated norbornenes and dicyclopentadiene.

Component (a) is particularly preferably dicyclopentadiene.

As catalysts for the ring-opening metathesis polymerisation (ROMP catalysts), a great number of compounds of the transition metals titanium, vanadium, molybdene, tungsten, rhenium, iridium, ruthenium and osmium are known to the expert. These catalysts are, for example, complex metal halides, metallo-carbenes or coordination catalysts of the Ziegler-Natta type. All these known ROMP catalysts can in principle be used as component (b) in the compositions of this invention.

Component (b) is preferably a ruthenium(+II) complex salt or an osmium(+II) complex salt, particularly preferably a ruthenium(+II) complex salt.

Because the fillers in accordance with component (c) often contain minor amounts of water, it is recommended to use ROMP catalysts which are unaffected by moisture, typically those ruthenium(+II) and osmium(+II) complex salts which are disclosed in WO 96/16100 and WO 96/20235.

Accordingly, component (b) is preferably a complex salt of formula III

$$(R_{29}R_{30}R_{31}P)_xL_yMe^{2+}Z_1^-Z_2^- \qquad (III),$$

wherein $R_{29}$, $R_{30}$ and $R_{31}$ are each independently of one another H, $C_1$–$C_{20}$-alkyl, $C_1$–$C_{20}$-alkoxy; $C_4$–$C_{12}$cycloalkyl or cycloalkoxy, each of which is unsubstituted or substituted by $C_1$–$C_6$alkyl, $C_1$–$C_6$haloalkyl or $C_1$–$C_6$alkoxy, or $C_6$–$C_{16}$aryl or $C_6$–$C_{16}$aryloxy, each of which is unsubstituted or substituted by $C_1$–$C_6$alkyl, $C_1$–$C_6$haloalkyl or $C_1$–$C_6$alkoxy, or $C_7$–$C_{16}$aralkyl or $C_7$–$C_{16}$aralkyloxy, each of which is unsubstituted or substituted by $C_1$–$C_6$alkyl, $C_1$–$C_6$haloalkyl or $C_1$–$C_6$alkoxy; $R_{30}$ and $R_{31}$ together are tetra- or pentamethylene, each of which is unsubstituted or substituted by $C_1$–$C_6$alkyl, $C_1$–$C_6$haloalkyl or $C_1$–$C_6$alkoxy, or tetra- or pentamethylenedioxyl, or tetra- or pentamethylene, each of which is unsubstituted or substituted by $C_1$–$C_6$alkyl, $C_1$–$C_6$haloalkyl or $C_1$–$C_6$-alkoxy and which is condensated with 1 or 2 1,2-phenylene, or tetra- or pentamethylenedioxyl, or tetramethylenedioxyl which is unsubstituted or substituted by $C_1$–$C_6$alkyl, $C_1$–$C_6$haloalkyl or $C_1$–$C_6$alkoxy and which is phenylene-condensated in the 1,2- and 3,4-positions, and $R_{31}$ has the meaning defined above;

L is a neutral ligand, Me is Ru or Os, $Z_1^-$ and $Z_2^-$ are each a singly charged anion, or $Z_1^-$ and $Z_2^-$ together are a doubly charged anion, x is a number from 1 to 3, and y is a number from 0 to 3, where $2 \leq x+y \leq 4$.

The ligands L in the compounds of formula III can be identical or different.

The ruthenium and osmium compounds of formula III are known or can be prepared according to known processes from the metal halides (for example $MeX_3$ or $[Me$ $areneX_2]_2$ by reaction with phosphines of formula IV

$$R_{29}R_{30}R_{31}P \qquad (IV),$$

wherein $R_{29}$, $R_{30}$, and $R_{31}$ have the same meaning as in formula (III), and from ligand formers.

$R_{29}$, $R_{30}$ and $R_{31}$ are preferably identical radicals. Sterically exacting radicals are likewise preferred, for example branched, preferably α-branched, alkyl or alkoxy or cyclic radicals.

$R_{29}$, $R_{30}$ and $R_{31}$ defined as alkyl can be linear or branched and may contain preferably 1 to 12, particularly preferably 1 to 8 and, most preferably, 1 to 6 carbon atoms. Typical examples of alkyl are methyl, ethyl, n- and i-propyl, n-, i- and t-butyl, the isomers of pentyl, hexyl, heptyl, octyl, nonyl, decyl, undecyl, dodecyl, tridecyl, tetradecyl, pentadecyl, hexadecyl, heptadecyl, octadecyl and eicosyl. Preferred examples are methyl, ethyl, n- and i-propyl, n-, i- and t-butyl, 1-, 2- or 3-pentyl and 1-, 2-, 3- or 4-hexyl.

$R_{29}$, $R_{30}$ and $R_{31}$ defined as alkoxy can be linear or branched and may contain preferably 1 to 12, particularly preferably 1 to 8 and, most preferably, 1 to 6 carbon atoms. Typical examples of alkoxy are methoxy, ethoxy, n- and i-propyloxy, n-, i- and t-butyloxy, the isomers of pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy and eicosyloxy. Preferred examples are methoxy, ethoxy, n- and i-propyloxy, n-, i- and t-butyloxy, 1-, 2- or 3-pentyloxy and 1-, 2-, 3- or 4-hexyloxy.

If $R_{29}$, $R_{30}$ and $R_{31}$ are substituted, then the substituents are preferably $C_1$–$C_4$alkyl, $C_1$–$C_4$haloalkyl or $C_1$–$C_4$alkoxy. Halogen is preferably Cl and, particularly preferably, F.

Typical examples of preferred substituents are methyl, methoxy, ethyl, ethoxy and trifluoromethyl. $R_{29}$, $R_{30}$ and $R_{31}$ are preferably substituted by 1 to 3 substituents.

$R_{29}$, $R_{30}$ and $R_{31}$ defined as cycloalkyl are preferably $C_5$–$C_8$cycloalkyl and, particularly preferably, $C_5$cycloalkyl or $C_6$cycloalkyl. Some examples are cyclobutyl, cycloheptyl, cyclooctyl and, in particular, cyclopentyl and cyclohexyl. Typical examples of substituted cycloalkyl are methyl-, dimethyl-, trimethyl-, methoxy-, dimethoxy-, trimethoxy-, trifluoromethyl-, bistrifluoromethyl- and tristrifluormethylcyclopentyl and -cyclohexyl.

$R_{29}$, $R_{30}$ and $R_{31}$ defined as cycloalkyloxy is preferably $C_5$–$C_8$cycloalkyloxy and, particularly preferably, $C_5$cycloalkyloxy or $C_6$cycloalkyloxy. Some examples are cyclobutyloxy, cycloheptyloxy, cyclooctyloxy and, in particular, cyclopentyloxy and cyclohexyloxy. Typical examples of substituted cycloalkyl are methyl-, dimethyl-, trimethyl-, methoxy-, dimethoxy-, trimethoxy-, trifluoromethyl-, bistrifluoromethyl- and tristrifluoromethyl-cyclopentyloxy and -cyclohexyloxy.

$R_{29}$, $R_{30}$ and $R_{31}$ defined as aryl are preferably $C_6$–$C_{12}$aryl and, particularly preferably, phenyl or naphthyl. Typical examples of substituted aryl are methyl-, dimethyl-, trimethyl-, methoxy-, dimethoxy-, trimethoxy-, trifluoromethyl-, bistrifluoromethyl- and tristrifluoromethylphenyl.

$R_{29}$, $R_{30}$ and $R_{31}$ defined as aryloxy are preferably $C_6$–$C_{12}$aryloxy and, particularly preferably, unsubstituted or substituted phenyloxy or naphthyloxy. Typical example of substituted aryloxy are methyl-, dimethyl-, trimethyl-, methylisopropyl-, isopropyl-, diisopropyl-, triisopropyl-, tert-butyl-, methyltert-butyl-, di(tert-butyl)-, tri(tert-butyl)-, methoxy-, dimethoxy-, trimethoxy-, trifluoromethyl-, bistrifluoromethyl- and tristrifluoromethylphenyloxy.

$R_{29}$, $R_{30}$ and $R_{31}$ defined as aralkyl are preferably $C_7$–$C_{13}$aralkyl, the alkylene group in the aralkyl preferably being methylene. Aralkyl is particularly preferably benzyl. Typical examples of substituted aralkyl are methyl-, dimethyl-, trimethyl-, methoxy-, dimethoxy-, trimethoxy-, trifluoromethyl-, bistrifluoromethyl- and tris (trifluoromethyl)benzyl.

$R_{29}$, $R_{30}$ and $R_{31}$ defined as aralkyloxy are preferably unsubstituted or substituted $C_7$–$C_{13}$aralkyloxy, the alkylene group in the aralkyloxy preferably being methylene. Aralkyloxy is particularly preferably unsubstituted or substituted benzyloxy. Typical examples of substituted aralkyloxy are methyl-, dimethyl-, trimethyl-, methoxy-, dimethoxy-, trimethoxy-, trifluoromethyl-, bis(fluoromethyl)- and tristrifluoromethylbenzyloxy.

Particularly preferred complex salts of formula III are those wherein $R_{29}$, $R_{30}$ and $R_{31}$ are $C_1$–$C_6$alkyl, $C_1$–$C_6$alkoxy, $C_4$–$C_{12}$cycloalkyl, $C_4$–$C_{12}$cycloalkoxy, $C_6$–$C_{16}$aryl or $C_6$–$C_{16}$aryloxy.

Very particularly preferred are the complex salts of formula III, wherein $R_{29}$, $R_{30}$ and $R_{31}$ are phenyl, tolyl or cyclohexyl.

Typical examples of suitable phosphines of formula IV are $(C_6H_5)_3P$, $(C_6H_5CH_2)_3P$, $(C_5H_{11})_3P$, $(CH_3)_3P$, $(C_2H_5)_3P$, $(n-C_3H_7)_3P$, $(i-C_3H_7)_3P$, $(n-C_4H_9)_3P$, $(C_6H_5)_2HP$, $(C_6H_5CH_2)_2HP$, $(C_5H_{11})_2HP$, $(CH_3)_2HP$, $(C_2H_5)_2HP$, $(n-C_3H_7)_2HP$, $(i-C_3H_7)_2HP$, $(n-C_4H_9)_2HP$, $(C_6H_5)H_2P$, $(C_6H_5CH_2)H_2P$, $(C_5H_{11})H_2P$, $(CH_3)H_2P$, $(C_2H_5)H_2P$, $(n-C_3H_7)H_2P$, $(i-C_3H_7)H_2P$, $(n-C_4H_9)H_2P$, $PH_3$, $(2-CH_3—C_6H_4)_3P$, $(3-CH_3—C_6H_4)_3P$, $(4-CH_3—C_6H_4)_3P$, $(2,4-Di-CH_3—C_6H_3)_3P$, $(2,6-Di-CH_3—C_6H_3)_3P$, $(2-C_2H_5—C_6H_4)_3P$, $(3-C_2H_5—C_6H_4)_3P$, $(4-C_2H_5—C_6H_4)_3P$, $(2-n-C_3H_7—C_6H_4)_3P$, $(3-n-C_3H_7—C_6H_4)_3P$, $(4-n-C_3H_7—C_6H_4)_3P$, $(2-i-

$C_3H_7$—$C_6H_4)_3$P, (3-i-$C_3H_7$—$C_6H_4)_3$P, (4-i-$C_3H_7$—$C_6H_4)_3$P, (2-n-$C_4H_9$—$C_6H_4)_3$P, (3-n-$C_4H_9$—$C_6H_4)_3$P, (4-n-$C_4H_9$—$C_6H_4)_3$P, (2-i-$C_4H_9$—$C_6H_4)_3$P, (3-i-$C_4H_9$—$C_6H_4)_3$P, (4-i-$C_4H_9$—$C_6H_4)_3$P, (2-t-$C_4H_9$—$C_6H_4)_3$P, (3-t-$C_4H_9$—$C_6H_4)_3$P, (4-t-$C_4H_9$—$C_6H_4)_3$P, (2-$CH_3$-6-t-$C_4H_9$—$C_6H_3)_3$P, (3-$CH_3$-6-t-$C_4H_9$—$C_6H_3)_3$P, (3-$CH_3$-6-t-$C_4H_9$—$C_6H_3)_3$P, (2,6-Di-t-$C_4H_9$—$C_6H_3)_3$P, (2,3-Di-t-$C_4H_9$—$C_6H_3)_3$P, (2,4-Di-t-$C_4H_9$—$C_6H_3)_3$P.

Particularly preferred phosphines are triisopropylphosphine, tri-tert-butylphosphine and tricyclohexylphosphine.

The ligands L which are bonded to the metal atom in the compounds of formula III can be photolabile or non-photolabile ligands.

In the case of compounds of formula III having photolabile ligands, the catalytic activity is achieved via the action of light, i.e. when the catalyst is irradiated with light in the visible or ultraviolet range, the photolabile ligand is split off, resulting in the formation of a catalytically active species for the metathesis polymerisation.

The photolabile ligands can be, for example, nitrogen ($N_2$), unsubstituted or OH—, $C_1$–$C_4$alkyl-, $C_1$–$C_4$alkoxy-, $C_6$–$C_{12}$aryl- or halogen-substituted monocyclic, polycyclic or condensated arenes containing 6 to 24, preferably 6 to 18 and, particularly preferably, 6 to 12, carbon atoms, or unsubstituted or $C_1$–$C_4$alkyl-, $C_1$–$C_4$alkoxy- or halogen-substituted monocyclic hetero arenes, condensated hetero arenes or condensated arene-hetero arenes containing 3 to 22, preferably 4 to 16 and, particularly preferably, 4 to 10, carbon atoms, and 1 to 3 hetero atoms selected from the group consisting of O, S and N; or unsubstituted or $C_1$–$C_4$alkyl, $C_1$–$C_4$alkoxy or halogen-substituted aliphatic, cycloaliphatic, aromatic or araliphatic nitriles containing 1 to 22, preferably 1 to 18, particularly preferably 1 to 12 and, most preferably, 1 to 7, carbon atoms. The preferred substituents are methyl, ethyl, methoxy, ethoxy, fluoro, chloro and bromo. The arenes and hetero arenes are preferably substituted by 1 to 3 radicals. Of the hetero arenes, the electron-rich hetero arenes are preferred.

Some examples of arenes and hetero arenes are benzene, biphenyl, naphthalene, anthracene, acenaphthene, fluorene, phenanthrene, pyrene, chrysene, fluoroanthrene, furan, thiophene, pyrrole, pyridine, y-pyran, y-thiopyran, pyrimidine, pyrazine, indole, coumarone, thionaphthene, carbazole, dibenzofuran, dibenzothiophene, pyrazole, imidazole, benzimidazole, oxazole, thiazole, isoxazole, isothiazol, quinoline, isoquinoline, acridine, chromene, phenazine, phenoxazine, phenothiazine, triazines, thianthrene and purine. Preferred arenes and hetero arenes are unsubstituted or substituted benzene, naphthalene, thiophene and benzthiophene. Arene is particularly preferably benzene which is unsubstituted or substituted by 1 to 3 $C_1$–$C_4$alkyl, and hetero arene is preferably thiophene.

The nitriles can, for example, be substituted by methoxy, ethoxy, fluoro or chloro; preferably the nitrites are unsubstituted. The alkyl nitrites are preferably linear. Some examples of nitrites are acetonitrile, propionitrile, butyronitrile, pentylnitrile, hexylnitrile, cyclopentylnitrile and cyclohexylnitrile, benzonitrile, methylbenzonitrile, benzylnitrile and naphthylnitrile. Nitriles are preferably linear $C_1$–$C_4$alkylnitriles or benzonitrile. Of the alkylnitriles, acetonitrile is particularly preferred.

In a preferred subgroup, the photolabile ligands are $N_2$; benzene, thiophene, benzonitrile or acetonitrile which are unsubstituted or substituted by 1 to 3 $C_1$–$C_4$alkyl.

Within the scope of this invention, a non-photolabile ligand (also termed coordinated ligand) means that the ligand dissociates not at all or only unsubstantially from the catalyst when said catalyst is irradiated in the visible or near ultraviolet spectral range.

The non-photolabile ligands can, for example, be the solvating inorganic or organic compounds containing the hetero atoms O, S or N, which are also often used as solvents. Typical examples of such compounds are $H_2O$, $H_2S$, $NH_3$; optionally halogenated, preferably fluorinated or chlorinated aliphatic or cycloaliphatic alcohols or mercaptans containing 1 to 18, preferably 1 to 12 and, particularly preferably, 1 to 6, carbon atoms, aromatic alcohols or thiols containing 6 to 18, preferably 6 to 12, carbon atoms, araliphatic alcohols or thiols containing 7 to 18, preferably 7 to 12, carbon atoms; open-chain or cyclic and aliphatic, araliphatic or aromatic ethers, thioethers, sulfoxides, sulfones, ketones, aldehydes, carboxylates, lactones, optionally N—$C_1$–$C_4$mono- or N—$C_1$–$C_4$dialkylated carboxamides containing 2 to 20, preferably 2 to 12 and, in particular, 2 to 6, carbon atoms and, if appropriate, N—$C_1$–$C_4$alkylated lactams; open-chain or cyclic and aliphatic, araliphatic or aromatic, primary, secondary and tertiary amines containing 1 to 20, preferably 1 to 12 and, particularly preferably, 1 to 6, carbon atoms.

Illustrative examples of such non-photolabile ligands are methanol, ethanol, n- and i-propanol, n-, i- and t-butanol, 1,1,1-trifluoroethanol, bistrifluoromethylmethanol, tristrifluoromethylmethanol, pentanol, hexanol, methylmercaptan or ethylmercaptan, cyclopentanol, cyclohexanol, cyclohexylmercaptan, phenol, methylphenol, fluorophenol, phenylmercaptan, benzylmercaptan, benzyl alcohol, diethyl ether, dimethyl ether, diisopropyl ether, di-n-butyl ether or di-t-butyl ether, tetrahydrofuran, tetrahydropyran, dioxan, diethyl thioether, tetrahydrothiophene, dimethylsulfoxide, diethylsulfoxide, tetra- and pentamethylenesulfoxide, dimethylsulfone, diethylsulfone, tetra- and pentamethylenesulfone, acetone, methyl ethyl ketone, diethyl ketone, phenyl methyl ketone, methyl isobutyl ketone, benzyl methyl ketone, acetaldehyde, propionaldehyde, trifluoroacetaldehyde, benzaldehyde, ethyl acetate, butyrolactone, dimethylformamide, dimethylacetamide, pyrrolidone and N-methylpyrrolidone.

The primary amines can conform to the formula $R_{26}NH_2$, the secondary amines to the formula $R_{26}R_{27}NH$ and the tertiary amines to the formula $R_{26}R_{27}R_{28}N$, wherein $R_{26}$ is $C_1$–$C_{18}$alkyl; $C_5$cycloalkyl or $C_6$cycloalkyl, each of which is unsubstituted or $C_1$–$C_4$alkyl- or $C_1$–$C_4$alkoxy-substituted, or $C_6$–$C_{18}$aryl or $C_7$–$C_{12}$aralkyl, each of which is unsubstituted or $C_1$–$C_4$alkyl- or $C_1$–$C_4$alkoxy-substituted, $R_{27}$ independently has the meaning of $R_{26}$, or $R_{26}$ and $R_{27}$ together are tetramethylene, pentamethylene, 3-oxa-1,5-pentylene or —$CH_2$—$CH_2$—NH—$CH_2$—$CH_2$— or —$CH_2$—$CH_2$—N($C_1$–$C_4$-alkyl)—$CH_2$—$CH_2$—, and $R_{28}$ independently has the meaning of $R_{26}$. Alkyl preferably contains 1 to 12 and, particularly preferably, 1 to 6, carbon atoms. Aryl preferably contains 6 to 12 carbon atoms, and aralkyl preferably contains 7 to 9 carbon atoms. Typical examples of amines are methylamine, dimethylamine, trimethylamine, ethylamine, diethylamine, triethylamine, methylethylamine, dimethylethylamine, n-propylamine, di-n-propylamine, tri-n-butylamine, cyclohexylamine, phenylamine and benzylamine, as well as pyrrolidine, N-methylpyrrolidine, piperidine, piperazine, morpholine and N-methylmorpholine.

Component (b) in the compositions of this inventions is preferably a complex salt of formula III, wherein L is an arene, hetero arene, nitrile, nitrogen ($N_2$), alcohol, amine, CO, $H_2O$ or $NH_3$.

Component (b) is particularly preferably a complex salt of formula III, wherein L is benzene, thiophene, benzonitrile, acetonitrile, nitrogen ($N_2$), each of which is unsubstituted or substituted by 1 to 3 $C_1$–$C_4$alkyl, an unsubstituted or partially or completely fluorinated $C_1$–$C_4$alcohol, CO, $H_2O$ or $NH_3$.

$Z_1^-$ and $Z_2^-$ in the compounds of formula III can each be a singly charged anion, where $Z_1^-$ and $Z_2^-$ can be identical or different, or $Z_1^-$ and $Z_2^-$ together can be a doubly charged anion.

Suitable anions are, for example, hydride ($H^-$), halide (for example $Cl^-$, $Br^-$ and $I^-$), $BF_4^-$, $PF_6^-$, $SbF_6^-$, $AsF_6^-$, cyclopentadienyl$^-$ which is unsubstituted or substituted by $C_1$–$C_4$alkyl, $C_1$–$C_4$alkoxy, ($C_1$–$C_4$alkyl)$_3$Si or ($C_1$–$C_4$alkyl)$_3$SiO, or indenyl$^-$, as well as the anions of oxygen acids.

Further suitable anions are $C_1$–$C_{12}$ alcoholate, preferably $C_1$–$C_6$alcoholate and, particularly preferably, $C_1$–$C_4$alcoholate, which are preferably branched, for example those corresponding to formula $R_xR_yR_zC$—$O^-$, wherein $R_x$ is H or $C_1$–$C_{10}$alkyl, $R_y$ is $C_1$–$C_{10}$alkyl and $R_z$ is $C_1$–$C_{10}$alkyl or phenyl. Typical examples are in particular i-propyloxy and t-butyloxy.

Other suitable anions are $C_3$–$C_{18}$acetylide, preferably $C_5$–$C_{14}$acetylide and, particularly preferably, $C_5$–$C_{12}$acetylide, which can conform to formula $R_w$—C≡$C^-$, wherein $R_w$ is $C_1$–$C_{16}$alkyl, preferably α-branched $C_3$–$C_{12}$alkyl, for example formula $R_xR_yR_zC$—, or phenyl or benzyl, each of which is unsubstituted or substituted by 1 to 3 $C_1$–$C_4$alkyl or $C_1$–$C_4$alkoxy. Some examples are i-propylacetylide, i- and t-butylacetylide, phenylacetylide, benzylacetylide, 2-methylphenylacetylide, 2-i-propylphenylacetylide, 2-i-propyl-6-methylphenylacetylide, 2-t-butylphenylacetylide, 2,6-di-t-butylphenylacetylide and 2-methyl-6-t-butylphenylacetylide.

The anions of oxygen acids can be, for example, sulfate, phosphate, perchlorate, perbromate, periodate, antimonate, arsenate, nitrate, carbonate, the anion of a $C_1$–$C_8$carboxylic acid, such as formiate, acetate, propionate, butyrate, benzoate, phenyl acetate, mono-, di- or trichloro- or -fluoroacetate, sulfonates, such as methylsulfonate, ethylsulfonate, propylsulfonate, butylsulfonate, trifluoromethylsulfonate (triflat), phenylsulfonate or benzylsulfonate, each of which is unsubstituted or substituted by $C_1$–$C_4$alkyl, $C_1$–$C_4$alkoxy or halogen, preferably fluoro, chloro or bromo, such as tosylate, mesylate, brosylate, p-methoxyphenylsulfonate or p-ethoxyphenylsulfonate, pentafluorophenylsulfonate or 2,4,6-triisopropylsulfonate, and phosphonates, typically methylphosphonate, ethylphosphonate, propylphosphonate, butylphosphonate, phenylphosphonate, p-methylphenylphosphonate and benzylphosphonate.

$Z_1^-$ and $Z_2^-$ in formula III are preferably $H^-$, $Cl^-$, $Br^-$, $BF_4^-$, $PF_6^-$, $SbF_6^-$, $AsF_6^-$, $CF_3SO_3^-$, $C_6H_5$—$SO_3^-$, p-toluenesulfonate (tosylate), 3,5-dimethylphenylsulfonate, 2,4,6-trimethylphenylsulfonate, 4-trifluoromethylphenylsulfonate or cyclopentadienyl.

Particularly preferred ROMP catalysts of formula III are [(cyclohexyl)$_3$P]$_2$RuCl$_2$, [(C$_6$H$_5$)$_3$P]$_3$RuCl$_2$, [(C$_6$H$_5$)$_3$P]$_3$(CO)RuH$_2$, [(C$_6$H$_5$)$_3$P]$_3$RuCl(cyclopentadienyl), [(cyclohexyl)$_3$P]$_2$—(CH$_3$OH)Ru(tosylate)$_2$, [(o-tolyl)$_3$P]$_3$RuCl$_2$, [(CH$_3$)$_2$CH]$_3$P(cumene)RuCl$_2$, (cyclohexyl)$_3$P-(cumene)RuCl$_2$ and, in particular, (1-methyl-4-isopropylbenzene)RuCl$_2$P(cyclohexyl)$_3$.

Fillers suitable for use as component (c) in the compositions of this invention are, for example, metal powders, wood flour, glass powder, glass beads, semimetal oxides and metal oxides, typically $SiO_2$ (aerosils, quartz, quartz powder, fused silica), corundum and titanium oxide, semimetal nitride and metal nitride, such as silicium nitride, boron nitride and aluminium nitride, semimetal carbide and metal carbide (SiC), metal carbonates (dolomite, chalk, $CaCO_3$), metal sulfates (barite, gypsum), mineral powders and natural or synthetic minerals, in particular from the silicate series, typically talcum, mica, kaolin, wollastonite, bentonite and others.

Component (c) is preferably a metal oxide, metal carbonate, metal sulfate or metal silicate, or $SiO_2$.

Component (c) is particularly preferably chalk, $Al_2O_3$ and $SiO_2$.

Of the different $SiO_2$ modifications, quartz powder is particularly preferred.

The silanes of formula I are known and can be prepared according to known methods. Some of these silanes are commercially available.

Preferred silanes are those of formula I, wherein R defined as monovalent organic group containing 2 to 100 carbon atoms is $C_1$–$C_{20}$alkyl, $C_5$–$C_{20}$aryl, $C_6$–$C_{20}$aralkyl, $C_5$–$C_{12}$cycloalkyl, $C_2$–$C_{20}$-alkoxyalkyl, $C_2$–$C_{20}$alkenyl, $C_4$–$C_{25}$acryloxyalkyl, $C_4$–$C_{25}$methacryloxyalkyl, $C_2$–$C_{20}$aminoalkyl, $C_4$–$C_{25}$glycidyloxyalkyl, $C_7$–$C_{25}$epoxycyclohexylalkyl or the radical of a polysiloxane.

Alkyl defined as R, $Y_1$, $Y_2$ or $Y_3$ typically includes methyl, ethyl, isopropyl, n-propyl, n-butyl, isobutyl, sec-butyl, tert-butyl as well as the different isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Aryl defined as R, $Y_1$, $Y_2$ or $Y_3$ preferably contains 6 to 10 carbon atoms and can be, for example, phenyl, pentalinyl, indenyl, naphtyl, azulinyl and anthryl.

Aralkyl defined as R, $Y_1$, $Y_2$ or $Y_3$ preferably contains 7 to 12 carbon atoms and, particularly preferably, 7 to 10 carbon atoms and is, for example, benzyl, phenethyl, 3-phenylpropyl, α-methylbenzyl, 4-phenylbutyl and α,α-dimethylbenzyl.

Cycloalkyl defined as R, $Y_1$, $Y_2$ or $Y_3$ is preferably $C_5$–$C_8$cycloalkyl, particularly preferably $C_5$cycloalkyl or $C_6$cycloalkyl. Some examples are cyclopropyl, dimethylcyclopropyl, cyclobutyl, cyclopentyl, methylcyclopentyl, cyclohexyl, cycloheptyl and cyclooctyl.

Typical examples of alkoxyalkyl defined as R, $Y_1$, $Y_2$ or $Y_3$ are 2-methoxyethyl, 2-ethoxyethyl, 2-methoxypropyl, 3-methoxypropyl, 2-ethoxypropyl and 3-ethoxypropyl.

Alkenyl defined as R typically includes propenyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-octadec-2-enyl and n-octadec-4-enyl.

Typical examples of acryloxyalkyl and methacryloxyalkyl are 2-acryloxyethyl, 2-methacryloxyethyl, 3-acryloxypropyl and 3-methacryloxypropyl.

Suitable aminoalkyl groups are, for example, 2-aminoethyl, 3-aminopropyl, 3-aminobutyl and 4-aminobutyl.

Suitable glycidyloxyalkyl groups can be, for example, 2-glycidylethyl, 3-glycidylpropyl, 3-glycidylbutyl and 4-glycidylbutyl.

Epoxycyclohexylalkyl is preferably β-(3,4-epoxycyclohexyl)ethyl.

R in formula I is preferably methyl, ethyl, n-octyl, vinyl, 3-mercaptopropyl, 3-aminopropyl, 3-glycidyloxypropyl, 3-acryloxypropyl, 3-methacryloxypropyl, β-(3,4-epoxycyclohexyl)ethyl, N-(β-aminoethyl)-3-aminopropyl, 3-ureidopropyl, 3-isocyanatopropyl, $H_2N-CH_2CH_2NH-CH_2CH_2NH-CH_2CH_2CH_2-$, $(CH_3O)_3Si-CH_2CH_2CH_2NH-CH_2CH_2CH_2-$ or a group of formula

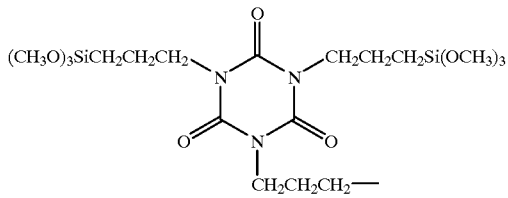

Particularly preferred are silanes of formula I, wherein R is methyl, vinyl, 3-mercaptopropyl or 3-aminopropyl. $Y_1$, $Y_2$ and $Y_3$ in formula I are preferably methyl, ethyl, acetyl or 2-methoxyethyl.

Illustrative examples of suitable silanes of formula I are octyltriethoxysilane, methyltriethoxysilane, methyltrimethoxysilane, tris[3-(trimethoxysilyl)propyl] isocyanurate, vinyltriethoxysilane, vinyltrimethoxysilane, vinyl-tris(2-methoxyethoxy)silane, γ-methacryloxypropyltrimethoxysilane, β-(3,4-epoxycyclohexyl)ethyltrimethoxysilane, γ-glycidyloxypropyltrimethoxysilane, γ-mercaptopropyltrimethoxysilane, γ-aminopropyltriethoxysilane, γ-aminopropyltrimethoxysilane, N-(β-aminoethyl)-γ-aminopropyltrimethoxysilane, $H_2NCH_2CH_2NHCH_2CH_2NHCH_2CH_2CH_2Si(OCH_3)_3$, bis[γ-(trimethoxysilyl)propyl]amine, organically modified polydimethylsiloxane of formula

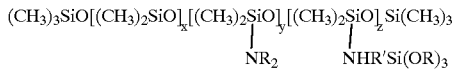

where R and R' are alkyl or aryl, γ-ureidopropyltrimethoxysilane, γ-isocyanatopropyltriethoxysilane, 3-chloropropyltrimethoxysilane, 3-triethoxysilylpropyl succinic anhydride, 3-methacryloxypropyltrimethoxysilane, vinyltris(2-methoxyethoxy)silane, vinyltriacetoxysilane, 3-mercaptopropyltrimethoxysilane, 3-glycidyloxypropyltriethoxysilane, 3-(2-aminoethylamino) propyltrimethoxysilane and 3-(2-aminoethylamino) propylmethyldimethoxysilane.

It merits particular mention that where quartz powder is used as filler instead of a mixture of components (c) and (d), it is also possible to use a quartz powder a mixture of components (c) and (d) which is pretreated with a silane of formula I. Such quartz powders which are pretreated with epoxysilane, alkylsilane or vinylsilane are commercially available e.g. under the trademarks Silbond® W12 EST, Vp W12 VST and Vp W12 SST.

The amount of components (a)–(d) in the compositions of this invention can vary over a wide range.

The compositions of this invention preferably contain 15–75% by weight of component (a), 0.001–10.0% by weight of component (b), 20–80% by weight of component (c) and 0.01–20.0% by weight of component (d), the sum of the components (a), (b), (c) and (d) being 100% by weight.

Particularly preferred compositions of this invention are those containing 25–65% by weight, in particular 30–50% by weight, of component (a), 0.01–2.0% by weight, in particular 0.1–1.0% by weight, of component (b), 30–75% by weight, in particular 50–70% by weight, of component (c) and 0.05–10.0% by weight, in particular 0.1–2.0% by weight, of component (d).

The preparation of the compositions of this invention can be carried out in conventional manner by mixing the components using known mixing (e.g. stirrers, rolls).

In addition to the components (a)–(d), the composition of this invention can also contain further conventional additives, typically antioxidants, light stabilisers, plasticisers, colourants, pigments, thixotropic agents, tougheners, antifoams, antistatic agents, lubricants and mould release agents.

The compositions of this invention can also comprise inert solvents. Suitable inert solvents are, for example, protic-polar and aprotic solvents which are used by themselves or in admixture with at least two solvents. Typical examples are: ether (dibutyl ether, tetrahydrofuran, dioxan, ethylene glycol monomethyl ether or ethylene glycol dimethyl ether, ethylene glycol monoethyl ether or ethylene glycol diethyl ether, diethylene glycol diethyl ether, triethylene glycol dimethyl ether), halogenated hydrocarbons (methylene chloride, chloroform, 1,2-dichloroethane, 1,1,1-trichloroethane, 1,1,2,2-tetrachloroethane), carboxylate and lactones (ethyl acetate, methyl propionate, ethyl benzoate, 2-methoxyethylacetate, γ-butyrolactone, δ-valerolactone, pivalolactone), carboxamides and lactams (N,N-dimethylformamide, N,N-diethylformamide, N,N-dimethylacetamide, tetramethylurea, hexamethylphosphoric acid triamide, γ-butyrolactam, ε-caprolactam, N-methylpyrrolidone, N-acetylpyrrolidone, N-methylcaprolactam), sulfoxides (dimethylsulfoxide), sulfones (dimethylsulfone, diethylsulfone, trimethylenesulfone, tetramethylenesulfone), tertiary amines (N-methylpiperidine, N-methylmorpholine), aliphatic and aromatic hydrocarbons, typically petroleum ether, pentane, hexane, cyclohexane, methylcyclohexane, benzene or substituted benzenes (chlorobenzene, o-dichlorobenzene, 1,2,4-trichlorobenzene, nitrobenzene, toluene, xylene) and nitriles (acetonitrile, propionitrile, benzonitrile, phenylacetonitrile). Preferred solvents are aprotic polar and apolar solvents.

Preferred solvents are aliphatic and aromatic hydrocarbons as well as mixtures of such solvents.

A particular advantage of the compositions of this invention is that in the case of liquid monomers a metathesis polymerisation can be carried out without using a solvent.

The composition of this invention can be prepared directly prior to the polymerisation or can be used as preformulated mixture. The mixture can be stored for a prolonged period of time before polymerisation as ready formulation, which is advantageous for large-scale industrial use. However, it is recommended to store the mixture with the exclusion of light if the catalyst comprises photolabile ligands.

The invention also relates to a process for the preparation of a metathesis polymer, which comprises heating a composition containing the components (a) to (d) to a temperature of >40° C.

The process of this invention is conveniently carried out at a temperature of at least 60° C. The novel process is in particular carried out in the temperature range of 60 to 300° C., preferably of 60 to 250° C., more preferably of 60 to to 200° C. and, most preferably, of 70 to 160° C. After the polymerisation it can be advantageous to afteranneal the mixture at elevated temperatures, e.g. from 80 to 200° C.

The polymerisation can involve moulding processes, such as calandering, casting, compression moulding, injection moulding or extrusion processes. With the process of this invention it is possible to produce materials for the preparation of mouldings of any kind and of coatings. Conveniently moulding and polymerisation are linked in solvent-free reactive systems and it is possible to employ processing methods such as injection moulding, extrusion and polymerisations in given forms (if appropriate under pressure).

The mixtures prepared according to the process of this invention can comprise homopolymers, copolymers with statistical distribution of the structural units, graft polymers, block polymers or crosslinked polymers. The polymers can have an average molecular weight of 500 to zu 2 000 000 dalton, preferably of 1000 to 1 000 000 dalton (determined by gel permeation chromatography).

The mixtures prepared according to the process of this invention have, in particular, high heat stability, excellent toughness and mechanical solidity as well as excellent electrical properties (low dielectric constant, low loss factor or tan δ value) and are especially suitable for use in the vacuum casting technology, preferably as encapsulating materials for electrical and electronic components. The cured casting compositions have good mechanical and dielectric properties and long durability.

Accordingly, the invention also relates to the use of the composition of this invention as encapsulating material for electrical or electronic components.

The following Examples illustrate the invention.

EXAMPLES

The dicyclopentadiene which is used in the following Examples is dried for at least 4 days at room temperature over KOH or a molecular sieve (5 Angstrom). Before use, the required amount of dicyclopentadiene is deaerated for about 10 minutes under vacuum (3 mbar). The ROMP catalyst in all Examples is (1-methyl-4-isopropylbenzene)$RuCl_2P(cyclohexyl)_3$ (catalyst A).

The following commercially available substances are also used:

| antifoam: | Byk 085 (Byk Chemie) |
| --- | --- |
| | Byk 066 (Byk Chemie) |
| fillers: | quartz powder W 12 (Quarzwerke Frechen) |
| | Silbond W 12 EST (Quarzwerke Frechen, quartz powder W 12, pretreated with epoxysilane) |
| | Vp W 12 VST (Quarzwerke Frechen, quartz powder W 12, pretreated with alkylsilane) |
| | Vp W 12 SST (Quarzwerke Frechen, quartz powder W 12, pretreated with vinylsilane) |
| Norsorex ® NS | thermoplastic polynorbornene (Nippon Zeon) |

Example 1

0.39 g of Norsorex® NS are dissolved, with stirring, in 38.95 g of dicyclopentadiene at 80° C. The solution is cooled to 60° C. and then 0.26 g of Byk 066, 0.49 g of vinyltrimethoxysilane (Silquest® A-171, supplied by Osi Specialties) and 0.2 g of catalyst A are added. The mixture is stirred for 10 minutes at 60° C. and then 59.71 g of quartz powder W 12 are added in increments. The mixture is stirred for 15 minutes without further heating and then deaerated under vacuum for 3–5 minutes. The mixture thus obtained is poured in an aluminium form and cured (2 h/80° C.; 4 h/100° C.; 1 h/150° C.). The mechanical and electrical properties of the brownish gray test sample are indicated in Table 1.

Example 2

0.39 g of Norsorex® NS are dissolved, with stirring, in 39.09 g of dicyclopentadiene at 80° C. The solution is cooled to 60° C. and then 0.26 g of Byk 066 and 0.2 g of catalyst A are added. The mixture is stirred for 10 minutes at 60° C. and then 60.06 g of Silbond W 12 EST are added in increments. The mixture is stirred for 10 minutes without any further heating and then deaerated under vacuum for 3–5 minutes. The mixture thus obtained is poured in an aluminium form and cured (2 h/80° C.; 4 h/100° C.; 1 h/150° C.). The mechanical and electrical properties of the brownish gray test sample are indicated in Table 1.

Example 3

The process described in Example 2 is repeated, using Vp W 12 VST instead of Silbond W 12 EST. The properties of the test sample thus cured are indicated in Table 1.

Example 4

The process described in Example 2 is repeated, using Vp W 12 SST instead of Silbond W 12 EST. The properties of the test sample thus cured are indicated in Table 1.

Example 5 (comparison)

0.39 g of Norsorex® NS are dissolved, with stirring, in 39.09 g of dicyclopentadiene at 80° C. The solution is cooled to 60° C. and then 0.26 g of Byk 066 and 0.2 g of catalyst A are added. The mixture is stirred for 10 minutes at 60° C. and then 60.06 g of quartz powder W 12 are added in increments. The mixture is stirred for 10 minutes without any further heating and then deaerated under vacuum for 3–5 minutes. The mixture thus obtained is poured in an aluminium form and cured (2 h/80° C.; 4 h/100° C.; 1 h/150° C.). The mechanical and electrical properties of the test sample thus obtained are indicated in Table 1.

TABLE 1

| Example | 1 | 2 | 3 | 4 | 5 |
| --- | --- | --- | --- | --- | --- |
| flexural strength [N/mm$^2$] | 103 | 54.9 | 61.8 | 47.5 | 41.5 |
| flexural elongation [%] | 2.3 | 1.3 | 1.13 | 3.79 | 1.28 |
| modulus of elasticity [N/mm$^2$] | 6281 | 6217 | 6196 | 4853 | 6774 |
| $K_{1C}$[1.)] [J/m$^2$] | 3.025 | | | | 2.51 |
| $G_{1C}$[2.)] [kJ/m$^2$] | 1358.5 | | | | 846.7 |
| impact strength dielectric loss factor: | 12 | | | | |
| T for tan δ < 0.05 [° C.][3.)] | 140 | 77 | 89 | 108 | 25 |
| T for tan δ < 0.10 [° C.][4.)] | 156 | 118 | 168 | 152 | 45 |
| dielectric constant $\epsilon_r$ | 3.5 | 3.9 | 3.7 | 3.6 | 2.4 |

[1.)]$K_{1C}$: critical stress intensity factor
[2.)]$G_{1C}$: specific fracture toughness
[3.)]temperature at which the tan δ value reaches 0.05
[4.)]temperature at which the tan δ value reaches 0.10

What is claimed is:

1. A composition, comprising (a) at least one tight cycloolefin, (b) a catalyst for the ring-opening metathesis polymerisation, which is a complex salt of formula III

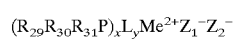

$$(R_{29}R_{30}R_{31}P)_xL_yMe^{2+}Z_1^-Z_2^- \quad \text{(III)},$$

wherein $R_{29}$, $R_{30}$ and $R_{31}$ are each independently of one another H, $C_1$–$C_{20}$alkyl, $C_1$–$C_{20}$alkoxy; $C_4$–$C_{12}$cycloalkyl or cycloalkoxy, each of which is unsubstituted or substituted by $C_1$–$C_6$alkyl, $C_1$–$C_6$haloalkyl or $C_1$–$C_6$alkoxy, or $C_6$–$C_{16}$aryl or $C_6$–$C_{16}$aryloxy, each of which is unsubstituted or substituted by $C_1$–$C_6$alkyl, $C_1$–$C_6$haloalkyl or $C_1$–$C_6$alkoxy, or $C_7$–$C_{16}$aralkyl or $C_7$–$C_{16}$aralkyloxy, each of which is unsubstituted or substituted by $C_1$–$C_6$alkyl, $C_1$–$C_6$haloalkyl or $C_1$–$C_6$alkoxy; $R_{30}$ and $R_{31}$ together are tetra- or pentamethylene, each of which is unsubstituted or substituted by $C_1$–$C_6$alkyl, $C_1$–$C_6$haloalkyl or $C_1$–$C_6$alkoxy, or tetra- or pentamethylenedioxyl, or tetra- or pentamethylene, each of which is unsubstituted or substituted by $C_1$–$C_6$alkyl, $C_1$–$C_6$haloalkyl or $C_1$–$C_6$-alkoxy and which is condensated with 1 or 2 1,2-phenylene, or tetra- or pentamethylenedioxyl, or tetramethylenedioxyl which is unsubstituted or substituted by $C_1$–$C_6$alkyl, $C_1$–$C_6$haloalkyl or $C_1$–$C_6$alkoxy and which is phenylene-condensated in the 1,2- and 3,4-positions, and $R_{31}$ has the meaning defined above;

L is a neutral ligand, Me is Ru or Os, $Z_1^-$ and $Z_2^-$ are each a singly charged anion, or $Z_1^-$ and $Z_2^-$ together are a doubly charged anion, x is a number from 1 to 3, and y is a number from 0 to 3, where $2 \leq x+y \leq 4$, (c) a filler, and
(d) a silane of formula I

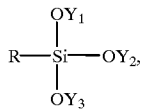

(I)

wherein R is a monovalent organic group having 2 to 100 carbon atoms, where one or more than one carbon atom can be replaced by O, S, N or Si atoms and where $Y_1$, $Y_2$ and $Y_3$ are each independently of one another $C_1$–$C_{20}$alkyl, $C_5$–$C_{20}$aryl, $C_6$–$C_{20}$aralkyl, $C_5$–$C_{12}$cycloalkyl, $C_2$–$C_{20}$-alkoxyalkyl or $C_1$–$C_{20}$acyl.

2. A composition according to claim 1, wherein component (a) is a compound of formula II

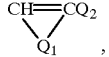

(II)

wherein $Q_1$ is a radical containing at least one carbon atom, which forms, together with the —CH=$CQ_2$ group, an alicyclic ring having at least 3 rings, which can contain one or more than one hetero atom selected from the group consisting of silicium, phosphorus, oxygen, nitrogen or sulfur and which is unsubstituted or substituted by halogen, =O, —CN, —$NO_2$, $R_1R_2R_3$Si—(O)$_u$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_{20}$alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$-aralkyl, $C_3$–$C_6$heterocycloalkyl, $C_3$–$C_{16}$heteroaryl, $C_4$–$C_{16}$heteroaralkyl or $R_4$—X—; or wherein two adjacent carbon atoms are linked via —CO—O—CO— or —CO—$NR_5$—CO—; or wherein an alicyclic, aromatic or heteroaromatic ring is fused to adjacent carbon atoms of the alicyclic ring, which alicyclic, aromatic or heteroaromatic ring is unsubstituted or substituted by halogen, —CN, —$NO_2$, $R_6R_7R_8$Si—(O)$_u$—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_{20}$-alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—$X_1$—; X and $X_1$ are each independently of the other —O—, —S—, —CO—, —SO—, —$SO_2$—, —O—CO—, —COO—, —CO—$NR_5$—, —$NR_{10}$—CO—, —$SO_2$—O— or —O—$SO_2$—; $R_1$, $R_2$ and $R_3$ are each independently of one another $C_1$–$C_{12}$alkyl, $C_1$–$C_{12}$perfluoroalkyl, phenyl or benzyl; $R_4$ and $R_{13}$ are each independently of the other $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl, $C_7$–$C_{16}$-aralkyl; $R_5$ and $R_{10}$ are each independently of the other hydrogen, $C_1$–$C_{12}$alkyl, phenyl or benzyl, the alkyl groups in turn being unsubstituted or substituted by $C_1$–$C_{12}$alkoxy or $C_3$–$C_8$-cycloalkyl; $R_6$, $R_7$ and $R_8$ are each independently of one another $C_1$–$C_{12}$alkyl, $C_1$–$C_{12}$perfluoroalkyl, phenyl or benzyl; M is an alkali metal, and $M_1$ is an alkaline earth metal; and u is 0 or 1; and where the alicyclic ring formed with $Q_1$ can contain other non-aromatic double bonds;

$Q_2$ is hydrogen, $C_1$–$C_{20}$alkyl, $C_1$–$C_{20}$haloalkyl, $C_1$–$C_{12}$alkoxy, halogen, —CN, $R_{11}$—$X_2$—; $R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl; $X_2$ is —COO— or —CO—$NR_{12}$—; $R_{12}$ is hydrogen, $C_1$–$C_{12}$alkyl, phenyl or benzyl; the above-mentioned cycloalkyl, heterocycloalkyl, aryl, heteroaryl, aralkyl and heteroaralkyl groups being unsubstituted or substituted by $C_1$–$C_{12}$alkyl, $C_1$–$C_{12}$alkoxy, —$NO_2$, —CN or halogen, and the hetero atoms of the above-mentioned heterocycloalkyl, heteroaryl and heteroaralkyl groups being selected from the group consisting of —O—, —S—, —$NR_9$— and —N=; and $R_9$ is hydrogen, $C_1$–$C_{12}$alkyl, phenyl or benzyl.

3. A composition according to claim 1, wherein component (a) is norbornene or a norbornene derivative.

4. A composition according to claim 1, wherein component (a) is dicyclopentadiene.

5. A composition according to claim 1, wherein component (b) is a complex salt of formula III, wherein $R_{29}$, $R_{30}$ and $R_{31}$ are $C_1$–$C_6$alkyl, $C_1$–$C_6$alkoxy, $C_4$–$C_{12}$cycloalkyl, $C_4$–$C_{12}$cycloalkoxy, $C_6$–$C_{16}$aryl or $C_6$–$C_{16}$aryloxy.

6. A composition according to claim 1, wherein component (b) is a complex salt of formula III, wherein $R_{29}$, $R_{30}$ and $R_{31}$ are phenyl, tolyl or cyclohexyl.

7. A composition according to claim 1, wherein component (b) is a complex salt of formula III, wherein L is an arene, hetero arene, nitrile, nitrogen ($N_2$), alcohol, amine, CO, $H_2O$ or $NH_3$.

8. A composition according to claim 1, wherein component (b) is a complex salt of formula III, wherein L is benzene, thiophene, benzonitrile, acetonitrile, nitrogen ($N_2$), each of which is unsubstituted or substituted by 1 to 3 $C_1$–$C_4$alkyl, an unsubstituted or partially or completely fluorinated $C_1$–$C_4$alcohol, CO, $H_2O$ or $NH_3$.

9. A composition according to claim 1, wherein component (b) is a complex salt of formula III, wherein $Z_1^-$ and $Z_2^-$ are independently of the other $H^-$, $Cl^-$, $Br^-$, $BF_4^-$, $PF_6^-$, $SbF_6^-$, $AsF_6^-$, $CF_3SO_3^-$, $C_6H_5$—$SO_3^-$, p-toluenesulfonate (tosylate), 3,5-dimethylphenylsulfonate, 2,4,6-trimethylphenylsulfonate or 4-trifluoromethylphenylsulfonate or cyclopentadienyl.

10. A composition according to claim 1, wherein component (b) is a ruthenium(+II) complex salt.

11. A composition according to claim 1, wherein component (c) is a metal oxide, metal carbonate, metal sulfate, metal silicate, or $SiO_2$.

12. A composition according to claim 1, wherein component (c) is chalk, Al$_2$O$_3$ or SiO$_2$.

13. A composition according to claim 1, wherein component (d) is a silane of formula I, wherein R is C$_1$–C$_{20}$alkyl, C$_5$–C$_{20}$aryl, C$_6$–C$_{20}$aralkyl, C$_5$–C$_{12}$cycloalkyl, C$_2$–C$_{20}$alkoxyalkyl, C$_2$–C$_{20}$alkenyl, C$_4$–C$_{25}$acryloxyalkyl, C$_4$–C$_{25}$methacryloxyalkyl, C$_2$–C$_{20}$aminoalkyl, C$_4$–C$_{25}$-glycidyloxyalkyl, C$_7$–C$_{25}$epoxycyclohexylalkyl or the radical of a polysiloxane.

14. A composition according to claim 1, wherein component (d) is a silane of formula I, wherein R is methyl, ethyl, n-octyl, vinyl, 3-mercaptopropyl, 3-aminopropyl, 3-glycidyloxypropyl, 3-acryloxypropyl, 3-methacryloxypropyl, β-(3,4-epoxycyclohexyl)ethyl, N-(β-aminoethyl)-3-aminopropyl, 3-ureidopropyl, 3-isocyanatopropyl, H$_2$N—CH$_2$CH$_2$NH—CH$_2$CH$_2$NH—CH$_2$CH$_2$CH$_2$—, (CH$_3$O)$_3$Si—CH$_2$CH$_2$CH$_2$NH—CH$_2$CH$_2$CH$_2$— or a group of formula

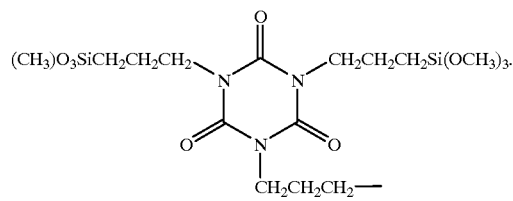

15. A composition according to claim 1, wherein component (d) is a silane of formula I, wherein R is methyl, vinyl, 3-mercaptopropyl or 3-aminopropyl.

16. A composition according to claim 1, wherein component (d) is a silane of formula I, wherein Y$_1$, Y$_2$ and Y$_3$ are methyl, ethyl, acetyl or 2-methoxyethyl.

17. A composition according to claim 1, containing 15–75% by weight of component (a), 0.001–10.0% by weight of component (b), 20–80% by weight of component (c) and 0.01–20.0% by weight of component (d).

18. A process for the preparation of a metathesis polymer, which comprises heating a composition according to claim 1 to >40° C.

* * * * *